Nov. 19, 1940.   R. E. GOULD ET AL   2,221,794
FORMING CERAMIC WARE
Filed June 13, 1938

Robert E. Gould
David A. Deaderick
INVENTORS

BY Arthur L. Davis

ATTORNEY

Patented Nov. 19, 1940

2,221,794

UNITED STATES PATENT OFFICE 2,221,794

FORMING CERAMIC WARE

Robert E. Gould and David A. Deaderick, Norris, Tenn.

Application June 13, 1938, Serial No. 213,442
3 Claims. (Cl. 25—129)

(Granted under the act of March 3, 1883, as amended April 30, 1928; 370 O. G. 757)

The invention herein described may be manufactured and used by or for the Government for governmental purposes without the payment to us of any royalty thereon.

This invention relates to a process of and apparatus for forming ceramic articles and is particularly directed to improvements in the formation of such articles by casting from fluid plastic material.

A principal object of this invention is to provide a process for the production of ceramic flatware articles which are substantially free from the internal stresses normally present when such articles are produced by conventional jiggering procedures. Another object of this invention is to provide a means for the rapid production of ceramic flatware articles which are substantially free from internal stresses. A further object of this invention is to provide a means for the uniform withdrawal of fluid plastic material from that portion of such material which is already set on a fluid pervious molding surface. A still further object of this invention is to provide a process for casting ceramic flatware articles and a means for performing the process which require only moderate skill for their operation.

We have discovered an improvement in the process of forming ceramic flatware articles from plastic material wherein such material in a fluid condition is cast on a fluid pervious molding surface which includes maintaining the fluid plastic material in contact with the molding surface for a length of time required for the setting of a portion of the plastic material on the molding surface to form the ceramic article, and withdrawing uniformly substantially all of the fluid plastic material from the set plastic material.

We have also discovered an apparatus for forming ceramic articles by the use of the above process which includes the combination of a fluid pervious mold with a substantially plano-convex molding surface and detachable means for maintaining a substantial amount of fluid plastic material above the surface of the mold.

Figure 1:
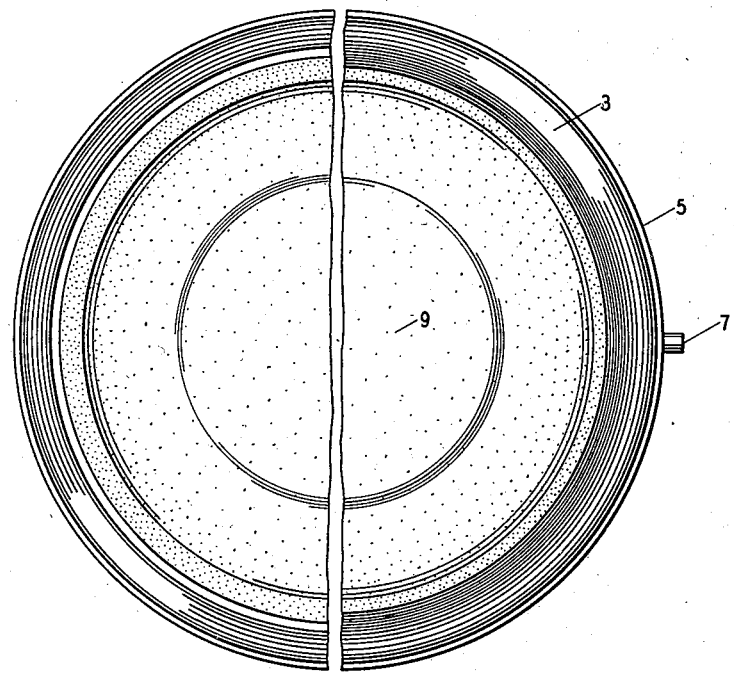

In the accompanying drawing which forms a part of the specification, and wherein reference symbols refer to like parts wherever they occur, Fig. 1 is a plan view of a fluid pervious ceramic ware mold with half the plan view shown with the pneumatic ring deflated and the other half with the pneumatic ring inflated.

Figure 2:
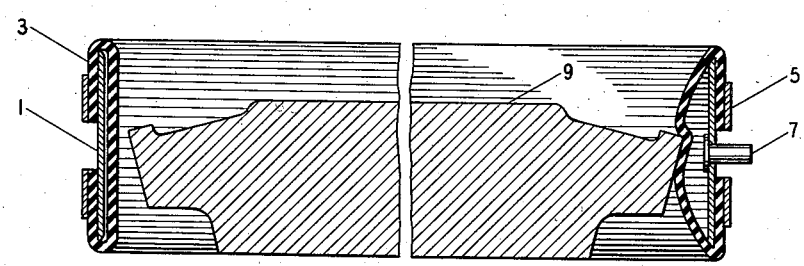

Fig. 2 is a vertical, sectional view of the ceramic ware mold shown in Fig. 1.

In Fig. 1 and Fig. 2, a cylindrical rim 1 is provided with a rubber covering 3 extending over the entire inner surface of the rim 1 and extending over the outer surface of the rim 1 sufficiently to be fluid imperviously sealed to the rim 1 by a pair of clamps, represented by clamp 5. A valve 7 is provided through the wall of rim 1 to allow alternate inflation and deflation of the pneumatic ring assembly. Sufficient clearance between a fluid pervious mold 9, complementary to the pneumatic ring, and the pneumatic ring is allowed to provide for discharge of the unset slip when the pneumatic ring is deflated, and to provide a fluid impervious seal around the mold to confine the slip, when the pneumatic ring is inflated.

It is evident that there are numerous factors which will influence conditions for the most satisfactory operation of our invention, the actual limits of which cannot be established except by a detailed study of each set of raw materials and the intermediate and finished products involved.

This invention contemplates the use of any fluid pervious molding surface. Ordinarily, regular plaster of Paris molds will be suitable for this purpose. However, in some instances, it may be desirable to use a thin flexible fluid pervious membrane conforming to and supported by a rigid element. In the latter case, it may be desirable to have subatmospheric pressure in communication with the sides of the membrane adjacent to its supporting element.

In the operation of this invention the mold is surrounded by a pneumatic ring which serves as a detachable means for maintaining a substantial amount of fluid plastic material above the surface of the mold. This ring is provided with means for readily inflating and deflating which is particularly desirable, not only for the purpose of carrying out the process, as the individual units are concerned, but also from the standpoint of line operation production. The pneumatic ring is preferably rigidly reinforced so that a uniform relationship between the ring and the mold may be maintained when the ring is inflated.

In the operation of the process and the apparatus, the pneumatic ring is placed around the mold in such a position that subsequently a substantial amount of fluid plastic material may be placed above the surface of the mold. The ring is then inflated to form a fluid impervious seal between the ring and the mold. The fluid plastic material is poured onto the mold and is maintained in contact with the molding surface for a length of time required for the setting of a portion of the plastic material on the molding surface to form the ceramic article. The ring is immediately deflated resulting in the withdrawal uniformly in all directions of a substantial portion of the fluid plastic material from the set plastic material by the action of the force of gravity. Using the ordinary plaster of Paris mold, such a mold may be rotated at such a speed that substantially all of the remaining cohesive fluid plastic material on the set plastic material is uniformly withdrawn by the action of centrifugal force. Using a thin fluid pervious conformable membrane, such as chamois skin, a sub-atmospheric pressure may be applied beneath the surface of the membrane, thereby resulting in the withdrawal of a substantial amount of water from the cohesive fluid plastic material remaining on the set plastic material.

It would be observed that this process and apparatus for carrying it out is not only readily susceptible to the rapid production of ceramic articles free from stresses and strains, but also readily susceptible to quantity production of such articles in line operation.

It will be seen, therefore, that this invention actually may be carried out by the use of various modifications and changes without departing from its spirit and scope, with only such limitations placed thereon as are imposed by the prior art.

We claim:

1. In the process of forming a ceramic article from fluid plastic material by casting on a fluid pervious molding surface, which is plano-convex, an improvement which comprises maintaining the fluid plastic material in contact with the molding surface for a length of time required for the setting of a portion of the plastic material on the molding surface to form the ceramic article, withdrawing uniformly a substantial portion of the fluid plastic material from the set plastic material by gravitational force, and withdrawing uniformly substantially all of the remaining cohesive fluid plastic material from the set plastic material by the application of centrifugal force.

2. In an apparatus for forming a ceramic article from fluid plastic material by casting, the improvement which comprises the combination of a fluid pervious mold with a substantially plano-convex molding surface, and detachable means for maintaining a substantial amount of fluid plastic material above the surface of the mold which comprises a pneumatic ring surrounding the mold, and means for readily inflating and deflating the said ring.

3. In an apparatus for forming a ceramic article from fluid plastic material by casting, the improvement which comprises the combination of a fluid pervious mold with a substantially plano-convex molding surface, and detachable means for maintaining a substantial amount of fluid plastic material above the surface of the mold which comprises a rigidly reinforced pneumatic ring surrounding the mold, and means for readily inflating and deflating the said ring.

ROBERT E. GOULD.
DAVID A. DEADERICK.